(12) United States Patent
Lau et al.

(10) Patent No.: US 8,051,078 B2
(45) Date of Patent: Nov. 1, 2011

(54) SYSTEM AND METHOD FOR COMMON INTEREST ANALYSIS AMONG MULTIPLE USERS

(75) Inventors: Clement Lau, Los Altos, CA (US); Richter A. Rafey, Santa Clara, CA (US); Ravi Gauba, Fremont, CA (US); Annie Wang, San Jose, CA (US); Klaus Hofrichter, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 322 days.

(21) Appl. No.: 11/243,598

(22) Filed: Oct. 4, 2005

(65) Prior Publication Data

US 2006/0036575 A1 Feb. 16, 2006

Related U.S. Application Data

(63) Continuation of application No. 09/922,465, filed on Aug. 3, 2001, now abandoned.

(51) Int. Cl.
*G06F 7/00* (2006.01)

(52) U.S. Cl. ............................ 707/732; 707/736; 725/53

(58) Field of Classification Search .................. 707/732, 707/999.03, 999.1, 736
See application file for complete search history.

(56) References Cited

U.S. PATENT DOCUMENTS

| | | | |
|---|---|---|---|
| 4,745,549 A | 5/1988 | Hashimoto | |
| 4,965,825 A | 10/1990 | Harvey et al. | |
| 5,146,552 A | 9/1992 | Cassorla et al. | |
| 5,223,924 A | 6/1993 | Strubbe | |
| 5,231,494 A | 7/1993 | Wachob | |
| 5,307,456 A | 4/1994 | MacKay | |
| 5,371,551 A | 12/1994 | Logan et al. | |
| 5,469,206 A | 11/1995 | Strubbe et al. | |
| 5,481,296 A | 1/1996 | Cragun et al. | |
| 5,483,277 A | 1/1996 | Granger | |
| 5,534,911 A | 7/1996 | Levitan | |
| 5,553,281 A | 9/1996 | Brown et al. | |
| 5,614,940 A | 3/1997 | Cobbley et al. | |
| 5,619,249 A | 4/1997 | Billock et al. | |
| 5,625,464 A | 4/1997 | Compoint et al. | |
| 5,635,979 A | 6/1997 | Kostreski et al. | |

(Continued)

OTHER PUBLICATIONS

Electronic House Com, EchoStart Communications Corporation and Geocast Network Systems Align to Deliver New Personalized Interactive Broadband Services to PC Users Via Satellite, Jun. 4, 2002, http://209.6.10.99/news101600echostar,html, 3 pages.

(Continued)

*Primary Examiner* — Cam Y T Truong

(74) *Attorney, Agent, or Firm* — Blakely, Sokoloffm, Taylor & Zafman LLP

(57) ABSTRACT

A multi-media broadcasting system that links a user profiles associated with a first user with a second user profile associated with a second user, where the first and second user profiles each comprise an indication of an interest common to the first and second users. The user profiles allow a user to customize a viewing experience via the broadcasting system. In addition, the system detects a content update to the first user profile, wherein the content update is associated with a content item that comprises content having a characteristic within the interest common to the first and second users. Furthermore, the system notifies the second user of the content update if the second user profile has not been updated with the content update.

4 Claims, 4 Drawing Sheets

U.S. PATENT DOCUMENTS

| | | | |
|---|---|---|---|
| 5,638,443 A | 6/1997 | Stefik et al. | |
| 5,699,107 A | 12/1997 | Lawler et al. | |
| 5,740,549 A | 4/1998 | Reilly et al. | |
| 5,754,938 A | 5/1998 | Herz et al. | |
| 5,758,257 A | 5/1998 | Herz et al. | |
| 5,758,259 A | 5/1998 | Lawler | |
| 5,797,010 A | 8/1998 | Brown | |
| 5,798,785 A | 8/1998 | Hendricks et al. | |
| 5,801,747 A | 9/1998 | Bedard | |
| 5,826,102 A | 10/1998 | Escobar et al. | |
| 5,852,435 A | 12/1998 | Vigneaux et al. | |
| 5,861,881 A | 1/1999 | Freeman et al. | |
| 5,861,906 A | 1/1999 | Dunn et al. | |
| 5,884,056 A | 3/1999 | Steele | |
| 5,884,298 A | 3/1999 | Smith, II et al. | |
| 5,889,958 A | 3/1999 | Willens | |
| 5,890,172 A | 3/1999 | Borman et al. | |
| 5,892,535 A | 4/1999 | Allen et al. | |
| 5,900,905 A | 5/1999 | Shoff et al. | |
| 5,968,109 A | 10/1999 | Israni et al. | |
| 6,005,597 A | 12/1999 | Barrett et al. | |
| 6,020,883 A | 2/2000 | Herz et al. | |
| 6,029,045 A | 2/2000 | Picco et al. | |
| 6,029,195 A * | 2/2000 | Herz | 725/116 |
| 6,047,327 A | 4/2000 | Tso et al. | |
| 6,064,380 A | 5/2000 | Swenson et al. | |
| 6,084,581 A | 7/2000 | Hunt | |
| 6,088,722 A * | 7/2000 | Herz et al. | 709/217 |
| 6,144,375 A | 11/2000 | Jain et al. | |
| 6,157,924 A * | 12/2000 | Austin | 707/10 |
| 6,160,570 A | 12/2000 | Sitnik | |
| 6,182,050 B1 | 1/2001 | Ballard | |
| 6,236,395 B1 | 5/2001 | Sezan et al. | |
| 6,269,369 B1 * | 7/2001 | Roberson | 707/10 |
| 6,289,346 B1 | 9/2001 | Milewski et al. | |
| 6,353,704 B1 | 3/2002 | Nakatani et al. | |
| 6,366,296 B1 | 4/2002 | Boreczky et al. | |
| 6,377,861 B1 | 4/2002 | York | |
| 6,427,164 B1 * | 7/2002 | Reilly | 709/206 |
| 6,442,144 B1 | 8/2002 | Hansen et al. | |
| 6,460,036 B1 * | 10/2002 | Herz | 707/10 |
| 6,463,444 B1 | 10/2002 | Jain et al. | |
| 6,463,585 B1 * | 10/2002 | Hendricks et al. | 725/35 |
| 6,473,751 B1 | 10/2002 | Nikolovska et al. | |
| 6,483,986 B1 | 11/2002 | Krapf | |
| 6,549,217 B1 | 4/2003 | De Greef et al. | |
| 6,567,980 B1 | 5/2003 | Jain et al. | |
| 6,574,378 B1 * | 6/2003 | Lim | 382/305 |
| 6,578,025 B1 | 6/2003 | Pollack et al. | |
| 6,609,106 B1 | 8/2003 | Robertson | |
| 6,614,987 B1 | 9/2003 | Ismail et al. | |
| 6,662,177 B1 | 12/2003 | Martino et al. | |
| 6,728,713 B1 | 4/2004 | Beach et al. | |
| 6,732,366 B1 | 5/2004 | Russo | |
| 6,756,997 B1 * | 6/2004 | Ward et al. | 715/716 |
| 6,757,691 B1 | 6/2004 | Welsh et al. | |
| 6,763,386 B2 | 7/2004 | Davis et al. | |
| 6,807,574 B1 | 10/2004 | Partovi et al. | |
| 6,813,775 B1 * | 11/2004 | Finseth et al. | 725/46 |
| 6,826,592 B1 | 11/2004 | Philyaw et al. | |
| 6,848,002 B1 | 1/2005 | Detlef | |
| 2001/0021994 A1 | 9/2001 | Nash | |
| 2002/0002705 A1 * | 1/2002 | Byrnes et al. | 725/14 |
| 2002/0023230 A1 * | 2/2002 | Bolnick et al. | 713/202 |
| 2002/0083451 A1 | 6/2002 | Gill et al. | |
| 2002/0170068 A1 | 11/2002 | Rafey et al. | |
| 2003/0005445 A1 * | 1/2003 | Schein et al. | 725/51 |
| 2003/0088872 A1 | 5/2003 | Maissel et al. | |
| 2003/0174861 A1 | 9/2003 | Levy et al. | |
| 2009/0234878 A1 * | 9/2009 | Herz et al. | 707/102 |

OTHER PUBLICATIONS

Lost Remote, The TV Revolution is Coming, Lost Remote TV New Media & Television Convergence News, TV News Gets (too?) Personal by Cory Bergman, Sep. 25, 2000, http://www.lostremote.com/producer/personal.html, 2 pages.

"Automatic Constructions of Personalized TV News Programs", Association of Computing Machinery (ACM) Multimedia Conf., 323-331 (Presented Nov. 3, 1999).

* cited by examiner

```
for each profile P do                                    702
    while more common interest C is found in P           704
        formulate a filter F representing C using information stored in P
                                                                              710
        for each profile A in other available profiles do  706
            send the filter F to A for evaluation  708
            wait for result from A which contains information related to common interest C
            if result not empty do  712
                store result in vector Ra  714
                add A to link L  716
            end
        end
        link together all profiles in L with common interest C  718
        reset L for each profile A do  730
        for each result r in vector Ra do  732
            for each profile B in other available profiles do
                if r not found in vector Rb do  734
                    add information r to common interest C of profile B  736
                end
            end
        end
    end
end
```

FIG. 7

SYSTEM AND METHOD FOR COMMON INTEREST ANALYSIS AMONG MULTIPLE USERS

RELATED APPLICATIONS

This application is a continuation of U.S. patent application Ser. No. 09/922,465, now abandoned, filed Aug. 3, 2001.

FIELD OF THE INVENTION

The system and method of the present invention relates to the customization of the operation of a device, for example, the viewing of programming on a media device.

BACKGROUND

As broadcasts become more sophisticated, information relevant to broadcasts can be communicated and used to generate program information including information relevant to the user's viewing interests. Thus, profiles may be generated for users to customize the user's viewing experience. The profile may include display-related information such as default background color and content related information, for example, annotations provided by the user for certain content, interest related, for example, genre like "science fiction" and preference related, for example, higher priority given to the science fiction channel to watch science fiction programming. If the system can accommodate a multiple user environment, each user would have his own profile, treated by the system independently.

SUMMARY OF THE INVENTION

In the system and method of the present invention, profiles that have a common interest are linked together such that when one common interest profile has an update of the common interest the other common interest profiles are notified of the update enabling the other common interest profiles to update their profiles.

BRIEF DESCRIPTION OF THE DRAWINGS

The objects, features and advantages of the present invention will be apparent to one skilled in the art from the following detailed description in which:

FIG. 7 is a pseudo-code illustration of an alternate embodiment of the present invention.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The system and method of the present invention will be described in the context of a satellite, cable or other type of broadcast system and the devices coupled thereto, such as the service provider's headend, the user's set top box, a broadcast receiver, the user's remote controller, a media storage device and the like. However, the system and method of the present invention should not be limited as such, and can be applied to other types of media accessed by multiple ways including other media devices including audio devices and computing devices.

The system and method of the present invention provides for a multi-user environment wherein each user has his own profile, and cross-referencing or linking is performed among profiles to provide useful feedback to the users of the profiles. The system provides a linkage among profiles with a common interest so that whenever a change or update occurs with respect to the common interest in one profile the other profiles that are linked to it will be notified of the change. In one embodiment, the user is notified via a message, for example through a coupled display device (e.g., a television monitor) or through an alternate medium, for example, the service provider's website or through email to the user. In another embodiment, the notification causes an automatic update of the other linked profiles.

Figure 1:
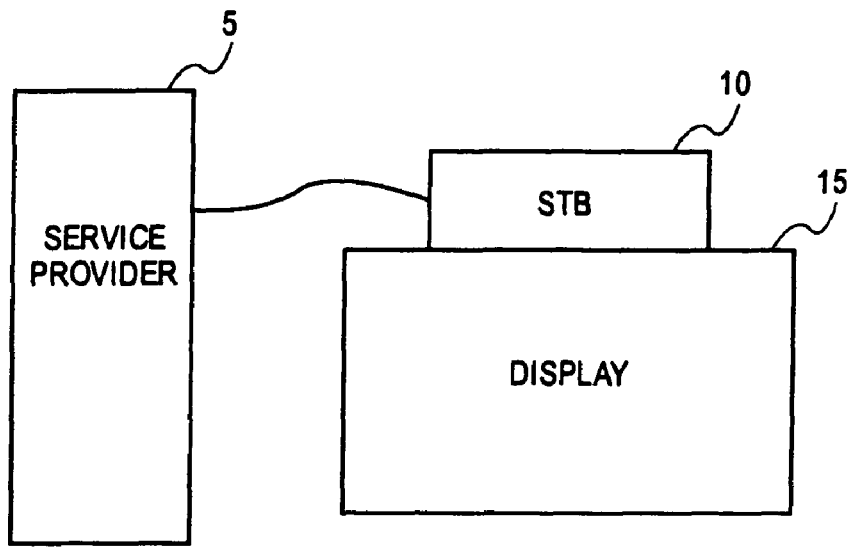
FIG. 1 illustrates one embodiment of a system which utilizes the teachings of the present invention.

One embodiment of the system of the present invention is shown in FIG. 1. The system includes a service provider 5 providing broadcast services to a controller 10, such as a set top box, which provides the broadcast to a display 15. The service provider 5 may be any one of a number of types of service providers including cable, satellite, as well as other broadcast services. The controller 10 which may be part of a television system or similar display apparatus 15 or part of a set top box 10. The service provider provides programs and program information to the controller 10 which generates programming and displays of program information in accordance with the teachings herein.

The system includes maintaining information, such as user profiles, for a user to customize his viewing experience. The information may include display-related information, for example default background color, content-related information, for example, annotations written by the user for certain content, interest-related information, for example genre, like science fiction and preference-related information, for example higher priority given to one channel to watch programming on that particular channel. In a multi-user environment, such as the home, housing a family of multiple viewers, each user would have his own profile or multiple profiles belonging to the same viewer. The environment may be more expansive than a particular home and can be defined a variety of ways, geographically and non-geographically related.

Figure 2:
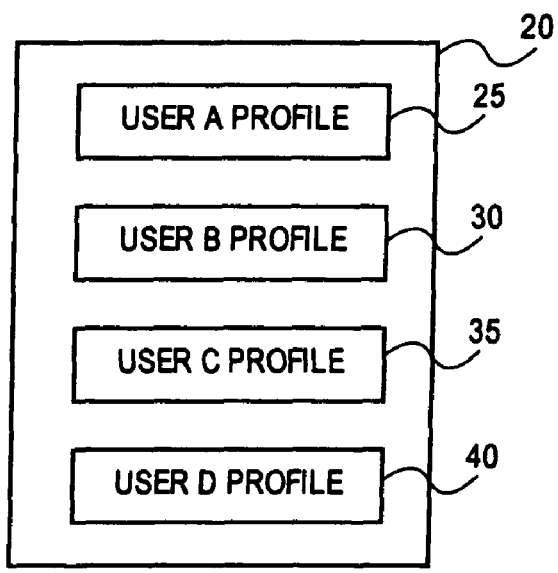
FIG. 2 illustrates an alternate embodiment.

In one embodiment, as illustrated in FIG. 2, the user profiles are stored in a storage device 20 such as memory. In the illustration, four profiles are maintained: user A profile 25, user B profile 30, user C profile 35 and user D profile 40. This profile information may be maintained by the service provider 5 or at the user's controller 10.

Figure 3:
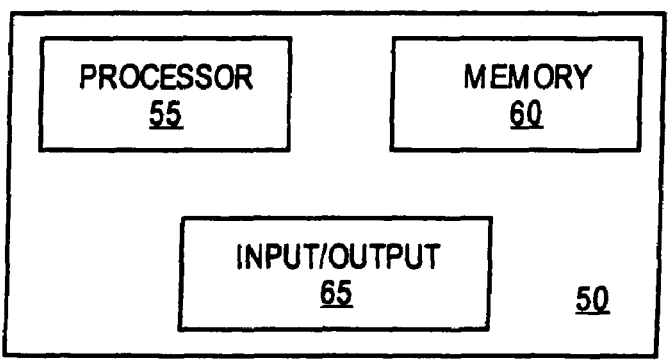
FIG. 3 illustrates multiple user profiles that may be contained in an implementation of the system of the present invention.

In one embodiment the controller includes that illustrated in the simplified block diagram of FIG. 3. Controller 50 includes a processor 55, memory 60 and input-output 65. Memory 60 stores instructions which, when executed by the processor 55 perform the methods described herein. Input-output 65 enables the transfer of information regarding the profiles as described herein. In a multi-user environment, where each user has its own profile, it is desirable to find common interest among the profiles by cross-referencing them. The result from the cross-reference often provides useful feedback to improve the usefulness of the profile. It is also desirable to link profiles with a common interest so that whenever a change occurs in one profile, the other profiles that are linked to it can be notified so that it can be determined whether any useful information has been added or removed from the updated profile and the other profiles can do a similar update if desired.

Figure 4:
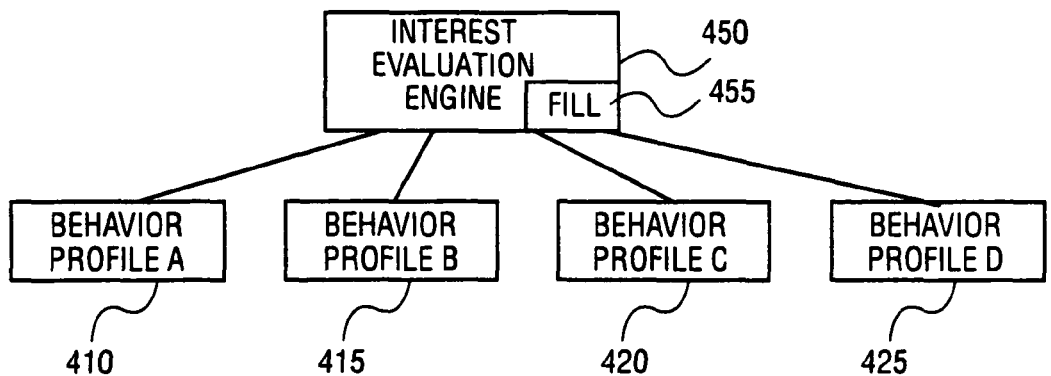
FIG. 4 is a simplified functional representation of one embodiment of the present invention.

FIG. 4 illustrates the functionality of the mechanism for linking behavior profiles for cross-referencing and notification of updates of linked profiles. In this illustration behavior profiles 410, 415, 420 and 425 are linked in accordance with a common interest, for example, type of programming (sports). The interest evaluation engine 450 in one embodiment determines profiles that have a common interest and links them together. In the present embodiment, interest evaluation engine 450 has determined profiles 410, 415, 420 and 425 having a common interest as to the type of program (sports) which is of interest to the corresponding users. The information set forth in the behavior profiles may be used to filter 455 information such as program information and actual programming in accordance with the behavior user profiles 410, 415, 420, 425.

The system also provides that when an update is performed on any of the profiles, for example profile 410, the profiles linked via the common interest updated are notified of the update. Thus, for example, if the common interest was sports and football and behavior profile 410 was updated to eliminate the viewing of a particular football game, this information would be provided to the other behavior profiles 415, 420 and 425.

In one embodiment this notification is a message sent to the users of the corresponding profiles 415, 420 and 425, the message indicating the update performed with respect to profile 410. This message may be communicated through a variety of means including through the system itself, for example, displayed on the broadcast monitor when the user is active on the system or through a different media, for example, an email message notifying the user of the update.

In one embodiment, the user has the option of responding to the update of the one profile 410 having the common interest. A variety of responses may be performed including updating to be consistent with the update profile 410, not updating his profile or modifying his profile differently in response to the update of profile 410. In one embodiment, the user is enabled to communicate actions to be taken in response to the notification through an input device such as a computer system coupled to the service provider's network or website or a input, such as a remote control button or button on the set top box which communicates the user's response, if any, to the notification. In an alternate embodiment the notification causes an automatic update of the linked profiles 415, 420, 425 to be consistent with the update performed in the linked profile 410.

Figure 5:
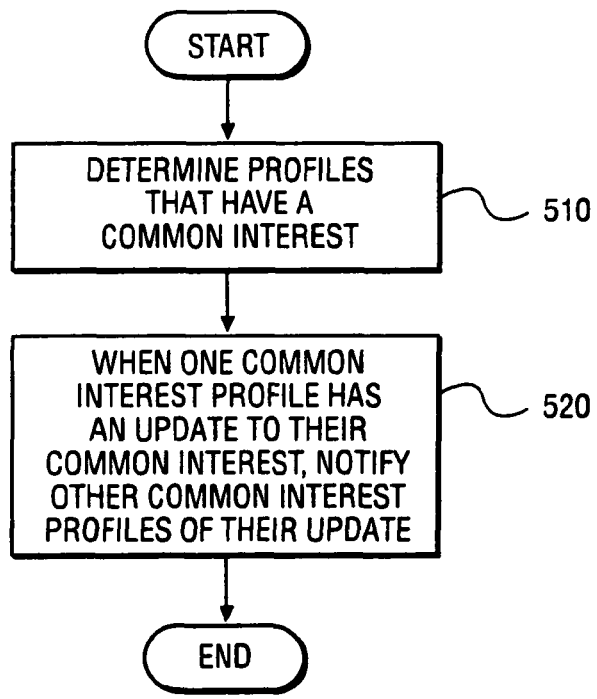
FIG. 5 is a simplified flow diagram of one embodiment of the method of the present invention.

One embodiment of the method of the present invention is illustrated by the simplified block diagram of FIG. 5. At step 510, the profiles that have a common interest are determined. At step 520, when one common interest profile has an update to the common interest the other common interest profiles are notified of the update.

Figure 6:
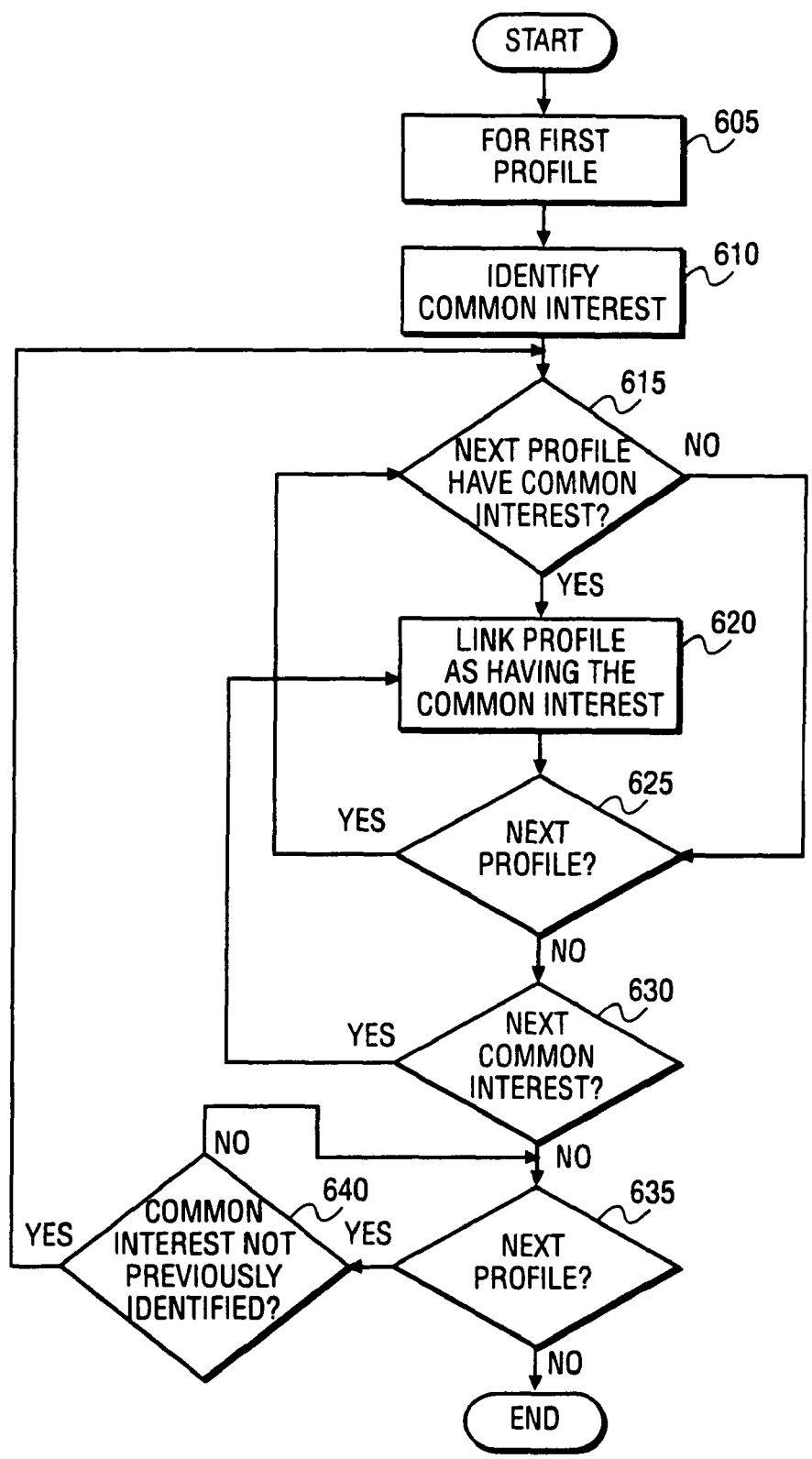
FIG. 6 illustrates an alternate embodiment of the present invention.

FIG. 6 illustrates an alternate embodiment of the present invention. At step 605 it is determined whether there are profiles to process. At step 610, the profile to process is identified. Thus, when the process is initiated, a first profile would be identified. At step 615, it is determined whether there are more common interests to process. Again, at the initiation of the process, if at least one common interest exists, the process proceeds to step 620 where a next common interest would be identified (at initiation, this next common interest would be the first common interest). At step 625, it is determined whether there are more profiles to review. If there are, the next profile is identified and if the profile has the same common interest as previously identified common interests and at step 640 if that profile has not yet been linked, then the profiles having the common interest are linked, step 645. Thus those profiles having a common interest are linked together and identified by that common interest. It is apparent that different sets of profiles may be identified in accordance with different common interests. The linking of the profiles may be performed a variety of ways. For example, a data structure may be established according to the common interest and the profiles having the common interest.

Referring back to FIG. 6, the process continues at steps 625, 630, 635, 640 and 645 to analyze the profiles and common interests and at steps 605, 610 and 620 to determine if there are more common interests to process. Thus, each profile is examined to see if their common interests that apply to other profiles such that profiles having a common interest are linked together.

FIG. 7 illustrates one embodiment of a process for automatically updating profiles, for example, at regular periods of time, without involvement of the user. Thus, at step 702, for each profile, P, having a common interest, a filter is formulated using the information stored in the profile, step 704. For each profile in other available profiles step 706 the profile is evaluated 708 and it is determined whether the profile contains common interest step 710. If that is the case step 712 the result is stored, step 714, such that all items that are resulting from the filter, for example, movie titles that are the type science fiction, are maintained. A link of the profile with the common interest is then performed, step 716. At step 718, all the profiles with the common interest are linked. This is performed for each profile. At step 730, for each profile and each result, step 732, in each profile of other profiles, step 733, if the new information is not found, step 734, this is added to the common interest of that profile, step 736. Thus, the first portion of the psuedo-code up to step 718 finds which profiles share the same common interest and links them together so that an update to any of them will notify all other profiles in the list to let them retrieve the update and modify its profile accordingly. Step 730 to 736 propagates information of a common interest that is found in a subset of profiles to the other linked profiles that don't have this information in its profile.

The invention has been described in conjunction with different embodiments. It is evident that numerous alternatives, modifications, variations and uses will be apparent to those skilled in the art in light of the forgoing description.

What is claimed is:

1. A computerized method comprising:
linking, a set-top-box without user input, a first user profile associated with a first user of a multi-user broadcasting system with a second user profile associated with a second user of the multi-user broadcasting system, wherein the linking is based on a program interest that is common to the first and second users, and wherein each user profile allows its associated user to customize a viewing experience received via the multi-user broadcasting system and the program interest is selected from the group consisting of type of program, genre of program, and content of program, wherein the linking includes determining the profiles that have a common interest which is of interest to corresponding the first and second users by using a filter;

detecting a user common interest content update to the first user profile, wherein the user common interest content update is associated with a content item having the program interest that is common to the first and second users; and notifying the second user of the user common interest content update without updating the second user profile with the user common interest content update;

receiving an indication from the second user to update the second user profile with the user common interest content update; and automatically updating the second user profile with the user common interest content update.

2. A non-transitory computer readable medium comprising instructions which when executed in a processing system performs a method for updating user profiles comprising:

linking, by a set top box without user input, a first user profile associated with a first user of a multi-user broadcasting system with a second user profile associated with a second user of the multi-user broadcasting system, wherein the linking is based on a program interest that is common to the first and second users, and wherein each user profile allows its associated user to customize a viewing experience received via the multi-user broadcasting system and the program interest is selected from the group consisting of type of program, genre of program, and content of program, wherein the linking includes determining the profiles that have a common interest which is of interest to corresponding the first and second users by using a filter;

detecting a user common interest content update to the first user profile, wherein the user common interest content update is associated with a content item having the program interest that is common to the first and second users; notifying the second user of the content update without updating the second user profile with the user common interest content update;

receiving an indication from the second user to update the second user profile with the user common interest content update; and automatically updating the second user profile with the user common interest content update.

3. An apparatus comprising:

a processor;

a memory coupled to the processor though a bus;

a storage device to store a first user profile associated with a first user of a multi-user broadcasting system and a second user profile associated with a second user of the multi-user broadcasting system, wherein the first and second user profiles each comprise an indication of a program interest common to the first and second users, and wherein each user profile allows its associated user to customize a viewing experience received via the multi-user broadcasting system and the program interest is selected from the group consisting of type of program, genre of program, and content of program, wherein the linking includes determining the profiles that have a common interest which is of interest to corresponding the first and second users by using a filter; and coded instructions stored in the memory which, when executed, cause the processor to:

link, without user input, the first user profile and the second user profile based on the common program interest, detect a user common interest content update to the first user profile, wherein the user common interest content update is associated with a content item having the program interest that is common to the first and second users, notify the second user of the content update without updating the second user profile with the user common interest content update, receive an indication from the second user to update the second user profile with the user common interest content update, and automatically update the second user profile with the user common interest content update.

4. A system comprising:

a processor;

a memory coupled to the processor though a bus; and coded instructions stored in the memory which, when executed, cause the processor to:

link, without user input, a first user profile associated with a first user of a multi-user broadcasting system with a second user profile associated with a second user of the multi-user broadcasting system, wherein the linking is based on a program interest that is common to the first and second users, and wherein each user profile allows its associated user to customize a viewing experience received via the multi-user broadcasting system and the program interest is selected from the group consisting of type of program, genre of program, and content of program, wherein the linking includes determining the profiles that have a common interest which is of interest to corresponding the first and second users by using a filter;

detect a user common interest content update to the first user profile, wherein the user common interest content update is associated with a content item having the program interest that is common to the first and second users;

notify the second user of the content update without updating the second user profile with the user common interest content update, receive an indication from the second user to update the second user profile with the user common interest content update, and automatically update the second user profile with the user common interest content update.

* * * * *